United States Patent [19]
Corbalis et al.

[11] Patent Number: 5,430,715
[45] Date of Patent: Jul. 4, 1995

[54] FLEXIBLE DESTINATION ADDRESS MAPPING MECHANISM IN A CELL SWITCHING COMMUNICATION CONTROLLER

[75] Inventors: Charles M. Corbalis, Saratoga; Ross S. Heitkamp, Mountain View; Mike M. Wu, Fremont; Amar Gupta, Cupertino, all of Calif.

[73] Assignee: Stratacom, Inc., San Jose, Calif.

[21] Appl. No.: 121,608

[22] Filed: Sep. 15, 1993

[51] Int. Cl.$^6$ ............................................. H04Q 11/04
[52] U.S. Cl. ...................... 370/54; 370/58.2; 370/60; 370/79; 370/94.1
[58] Field of Search ............... 370/54, 60, 58.2, 60.1, 370/79, 94.1

[56] References Cited

U.S. PATENT DOCUMENTS

| | | | |
|---|---|---|---|
| 4,920,531 | 4/1990 | Isono et al. | 370/60 |
| 5,191,582 | 3/1993 | Upp | 370/94.1 |
| 5,243,596 | 9/1993 | Port et al. | 370/94.1 |
| 5,271,010 | 12/1993 | Miyake et al. | 370/94.1 |
| 5,307,343 | 4/1994 | Bostica et al. | 370/60 |

FOREIGN PATENT DOCUMENTS 0552384  7/1993  WIPO .......................... H04L 12/56

OTHER PUBLICATIONS

Globecom '92, vol. 3, Dec., 1992, Orlando US, pp. 1282–1287, P. Oechslin, et al., Entitled: ALI: A Versatile Interface Chip for ATM Systems.
Telecom Report, vol. 15, No. 3/4, 1992, Munchen De pp. 152–155, H. Schneider, Entitled: Breitbandkommunikation Auf Schnellen Wegen.

*Primary Examiner*—Douglas W. Olms
*Assistant Examiner*—Russell W. Blum
*Attorney, Agent, or Firm*—Blakely, Sokoloff, Taylor & Zafman

[57] ABSTRACT

A mechanism for routing a communication cell in a cell switching communication controller that employs multiple path identifier masking functions selected by a header control field in the communication cell and that employs a content addressable memory comprising a plurality of entries, wherein each entry stores a pre configured local termination identifier and a pre configured pass through identifier.

15 Claims, 10 Drawing Sheets

FLEXIBLE DESTINATION ADDRESS MAPPING MECHANISM IN A CELL SWITCHING COMMUNICATION CONTROLLER

FIELD OF THE INVENTION

The present invention pertains to the field of digital communication controllers. More particularly, this invention relates to a flexible destination address mapping mechanism for routing communication cells in a communication controller.

BACKGROUND OF THE INVENTION

Cell relay networks are commonly employed to transfer digital information over long distances. A typical cell relay network is comprised of a set of communication controllers coupled together for communication over common carrier communication links. A variety of communication devices may be coupled to the communication controllers over local communication links.

Such a cell relay network enables a variety of communication devices coupled to the communication controllers to share the common carrier communication links. The communication devices transfer digital information in the form of communication cells or packets over the common carrier communication links on a demand driven basis. The demand driven sharing of the common carrier communication links in such a cell relay network reduces the cost of maintaining a long distance communication network.

Typically, each communication cell transferred over such a cell relay network contains a cell header that specifies a destination address. The destination address identifies a virtual circuit connection on the cell relay network. The cell header specifies a virtual circuit (or a group of virtual circuits) which interconnect a source and destination pair.

For example, a prior cell network interface standard provides a 32 bit destination address format. The destination address comprises a virtual path identifier field (VPI), a virtual circuit identifier field (VCI), and a standard specific control field. The destination address optionally comprises a generic flow control field. The VPI is commonly used to group communication cell transmission through the cell relay network for a set of communication devices. The VCI is commonly used to uniquely identify communication devices within the VPI groups.

A communication controller in such a cell network typically decodes the destination address of an inbound communication cell to determine whether the communication cell is a pass through communication cell or a locally terminated communication cell. A locally terminated communication cell contains a destination address that specifies a local circuit connection to the communication controller. A pass through communication cell contains a destination address that specifies a circuit connection to some other communication controller in the cell relay network.

For example, such a communication controller may decode the VPI and VCI portions of the destination address to determine whether an inbound communication cell is locally terminated. The communication controller may decode the VPI portion of the destination address to route a pass through communication cell to the appropriate destination.

Typical prior communication controllers implement a look-up table mechanism to decode the destination address of inbound communication cells. However, a look-up table that fully decodes the VPI and VCI fields of an inbound communication cell requires an extremely large look-up table. Such a large look-up table greatly increases the cost of the communication controller, and reduces the speed of communication cell processing.

As a consequence, prior communication controllers usually simplify the look-up table mechanism by limiting the number of useful destination address bits. For example, one prior communication controller limits the VCI field to 10 valid bits and the VPI to 5 valid bits. Such limitations simplify the look-up function, and reduce the amount of memory required to implement the look-up table.

Unfortunately, such prior communication controllers having a limited number of useful destination address bits severely limit the flexibility of cell relay network configuration. Such prior communication controllers limit the number of available destination addresses, and thereby impose limits on the assignment of destination addresses to communication devices. Such prior communication controllers also impose limits on the grouping of cell transmissions by limiting the usefulness of virtual path identifiers.

SUMMARY AND OBJECTS OF THE INVENTION

One object of the present invention is to provide a flexible destination address mapping mechanism for a cell switching communication controller.

Another object of the present invention is to provide a destination address mapping mechanism that fully decodes the entire destination address range of communication cells in a cell relay network.

A further object of the present invention is to decode the destination address by employing multiple sets of local termination masking functions and pass through masking functions that are selected by a header control field in the cell header of the communication cell.

Another object of the present invention is to map the decoded destination address to a cell frame header for routing the communication cell through an internal switching fabric by employing a two pass content addressable memory match, wherein each entry in the content addressable memory stores a local termination identifier and a pass through identifier.

Another object of the present invention is to enable a user to pre configure the masking functions, the local termination and pass through identifiers, and the cell frame headers according to the topology of the cell relay network.

These and other objects of the invention are provided by a method for routing a communication cell in a cell switching communication controller. A communication module in the communication controller receives the communication cell over a first communication link in a cell relay network. The communication cell comprises a cell header that specifies a destination address for the communication cell. The communication module generates a path identifier by performing a path identifier masking function on the destination address. The path identifier masking function is defined by a set of predetermined mask data values stored in a mask function memory of the communication module.

The communication module matches the path identifier to a content addressable memory such that a match address in the content addressable memory specifies a cell frame header block in a cell frame header table. The content addressable memory comprises a plurality of entries, wherein each entry stores a pre configured local termination identifier and a pre configured pass through identifier. The communication module reads the cell frame header block from the cell frame header table according to the match address, and generates a cell frame comprising the cell frame header, the cell header, and a cell payload from the communication cell.

The communication module then transfers the cell frame to a destination communication module specified by the cell frame header, such that the destination communication module transfers the communication cell over a second communication link.

Other objects, features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
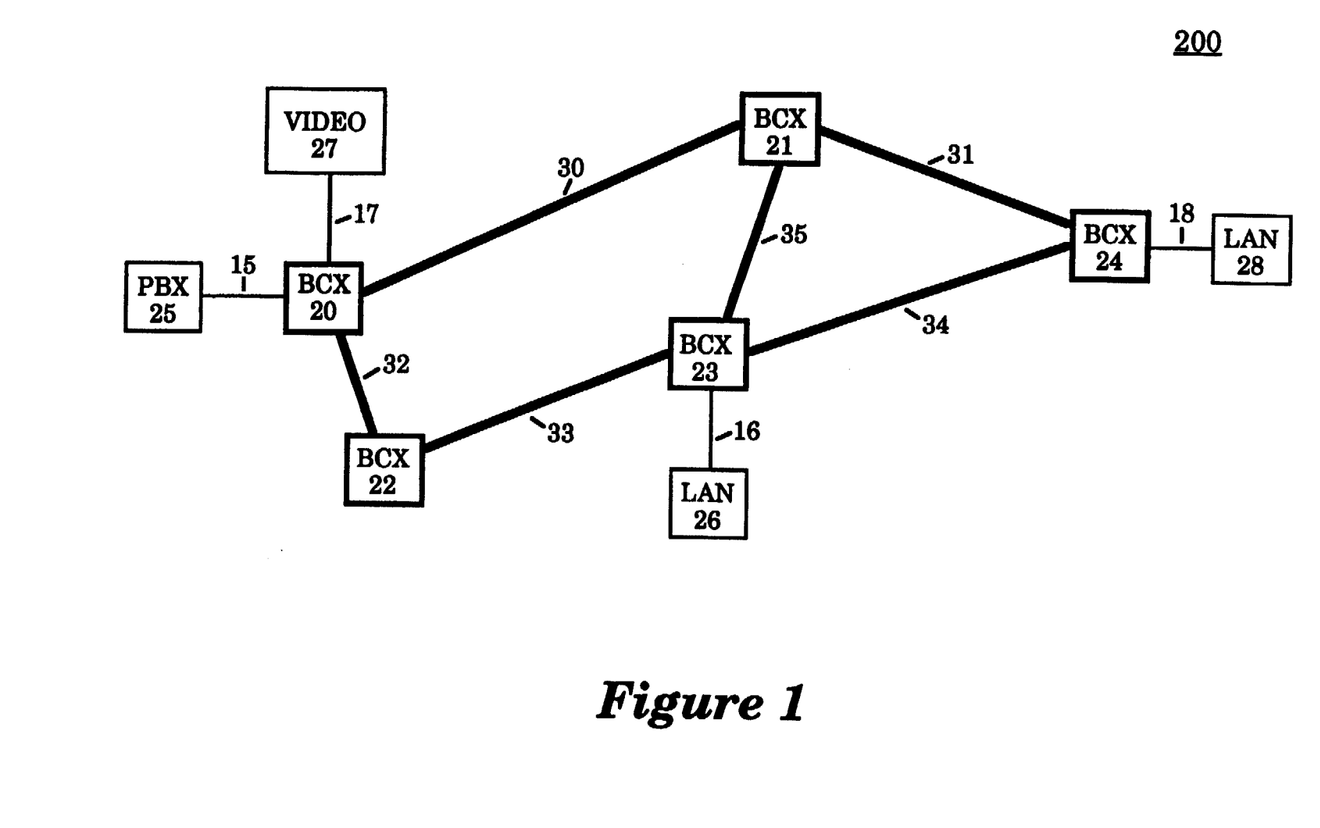
FIG. 1 illustrates one communication network comprising a set of communication devices and a set of broadband cell exchange units (BCX)

FIG. 1 illustrates one communication network 200. The communication network 200 is comprised of a set of broadband cell exchange units (BCX) 20–24. The broadband cell exchange units 20–24 enable communication over a set of broadband communication links 30–35 according to a cell switching communication protocol. For one embodiment, each BCX 20–24 enables high speed communication over thirty-six separate broadband communication links.

For example, the BCX 20 enables communication over the broadband communication links 30 and 32, and the BCX 23 enables communication over the broadband communication links 33–35.

The broadband cell exchange units 20–24 also enable long distance communication among a wide variety of communication devices over the communication network 200. The communication devices are coupled to the broadband cell exchange units 20–24 via local communication links.

For example, the BCX 20 enables communication over the communication network 200 by a private branch exchange (PBX) 25. The BCX 20 is coupled for communication with the PBX 25 over a local communication link 15.

The BCX 20 also enables communication with a video communication controller (VIDEO) 27 over the communication network 200. The BCX 20 is coupled for communication with the video communication controller 27 over a local communication link 17.

The BCX 23 enables communication with a local area network controller (LAN) 26 over the communication network 200. The BCX 23 is coupled for communication with the local area network controller 26 over a local communication link 16. Also, the BCX 24 enables communication with a local area network controller 28 over a local communication link 18.

The BCX's 20–24 also perform tandem cell switching for the communication network 200. For example, the video communication controller 27 communicates with the local area network controller 28 by transferring communication cells through the BCX's 20, 21 24. The BCX 2 performs tandem cell switching for communication cell transfer between the video communication controller 27 and the local area network controller 28.

The video communication controller 27 may alternatively communicate with the local area network controller 28 by transferring communication cells through the BCX's 20, 22, 23 and 24, such that the BCX's 22 and 23 perform tandem cell switching.

Figure 2:
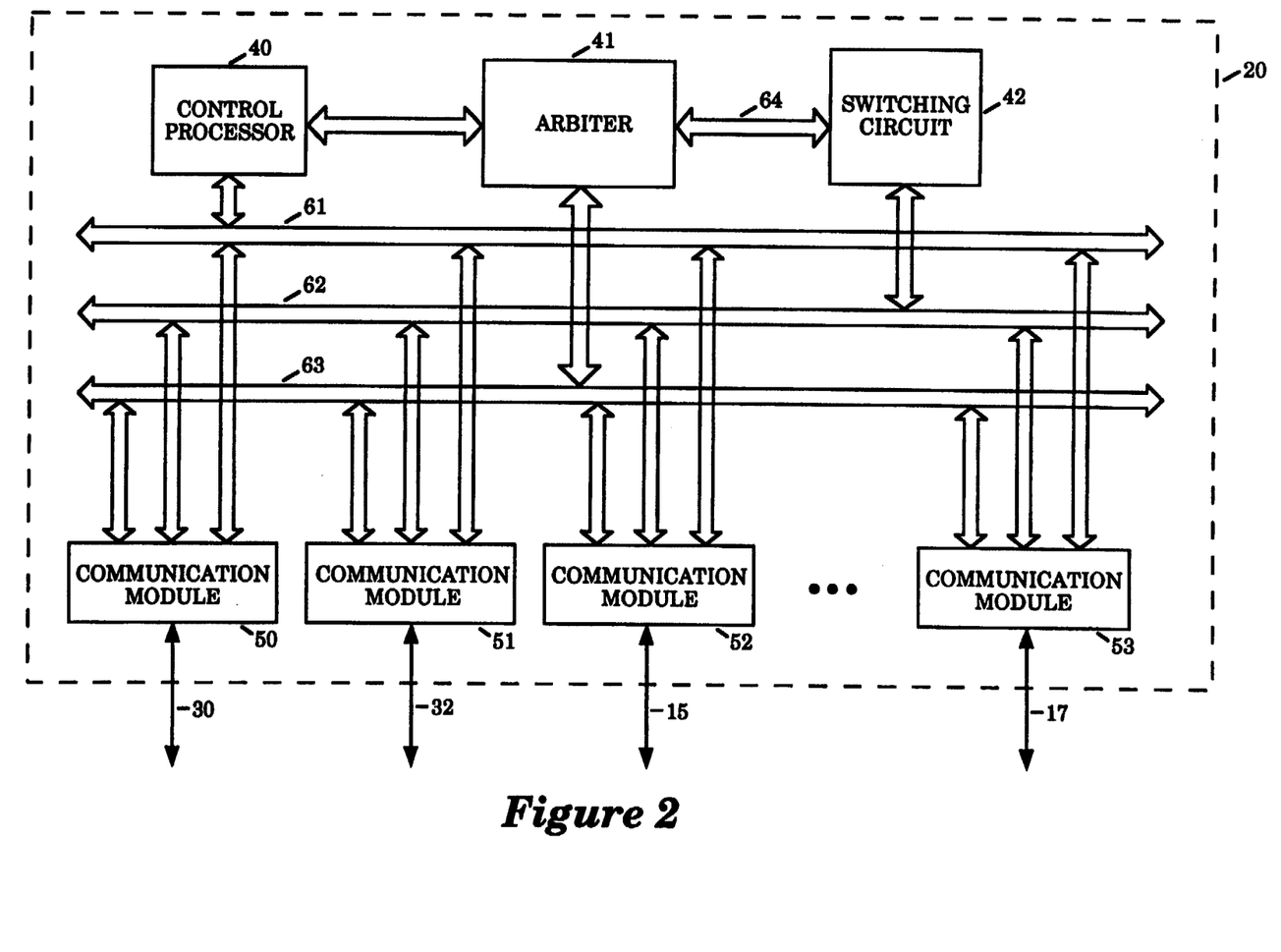
FIG. 2 is a block diagram of a broadband cell exchange unit comprising a set of communication modules, along with a control processor, an arbiter, and a switching circuit.

FIG. 2 is a block diagram of the BCX 20. The BCX 20 comprises a set of communication modules 50–53, along with a control processor 40, an arbiter 41, and a switching circuit 42.

The communication modules 50–53 enable high speed communication over a variety of communication links according to a cell switching communication protocol. For example, the communication modules 50 and 51 enable communication over the broadband communication links 30 and 32, respectively. The communication module 52 enables communication over the local communication link 15, and the communication module 53 enables communication over the local communication link 17.

The communication modules 50–53 exchange communication cells by transferring cell frames over a set of cell exchange lines 62. The cell exchange lines 62 comprise multiple pairs of transmit and receive data lines. The cell exchange lines 62 provide a pair of transmit and receive data lines for each of the communication modules 50–53. The cell exchange lines 62 enable concurrent transmission of multiple serial data streams among the communication modules 50–53.

The switching circuit 42 provides full serial communication connectivity among the communication modules 50–53. through the cell exchange lines 62.

The arbiter 41 controls the configuration of the switching circuit 42. The arbiter 41 determines transmission requests by polling the communication modules 50-53 over an arbitration/control bus 63. The arbiter 41 configures the switching circuit 42 for single-destination transmissions and multicast transmissions.

A single-destination configuration of the switching circuit 42 provides a serial data transfer link between one source communication module and one destination communication module. A multicast configuration of the switching circuit 42 provides multiple serial data transfer links from one source communication module to multiple destination communication modules.

The communication modules 50-53 function as source communication modules by receiving inbound communication cells over the communication network 200, encapsulating the inbound communication cells into cell frames having an internal cell frame format, and transferring the cell flames through serial data transfer links in the cell exchange lines 62 to the appropriate destination communication modules.

Each cell frame contains a cell frame header that specifies the appropriate destination communication module from among the communication modules 50-53. The cell frame header specifies a primary and a secondary destination communication module for a single destination communication cell, or a set of destination communication modules for a multicast communication cell. The cell frame header also specifies a queue channel in the destination communication module to buffer the communication cell prior to outbound transfer.

The communication modules 50-53 function as destination communication modules by receiving the cell frames through the serial data transfer links in the cell exchange lines 62, and extracting the communication cells from the cell frames. The destination communication modules buffer the disassembled communication cells in the specified queue channels, and then transfer the communication cells over the communication network 200 as outbound communication cells according to pre defined service parameters for the queue channels.

The communication modules 50-53 determine the cell frame headers required to properly navigate the inbound communication cells through the BCX 20. The communication modules 50-53 determine the cell frame headers by mapping the cell headers of the inbound communication cells to a set of pre configured cell frame headers. Each communication module 50-53 contains a cell frame header table that stores the pre configured cell frame headers. The control processor 40 writes the pre configured cell frame headers into the cell frame header tables over a control processor bus 61.

For example, the communication module 50 contains a preprogrammed cell frame header table that stores a set cell frame header blocks. Each cell frame header block defines a cell frame path through the BCX 20. Each cell frame header block specifies one or more destination communication modules from among the communication modules 51-53 for the corresponding cell frame. Each cell frame header block also specifies a queue channel in the destination communication module.

The communication module 50 receives an inbound communication cell over the broadband communication link 30 and extracts the cell header. The communication module 50 determines whether the cell header of the inbound communication cell specifies a path through the BCX 20 or whether the inbound communication cell terminates locally on the BCX 20.

The communication module 50 then selects a cell frame header for the inbound communication cell by mapping the destination address of the cell header to the cell frame header table. The selected cell frame header specifies a destination communication module coupled to the appropriate broadband communication link if the inbound communication cell specifies a path through the BCX 20. The selected cell frame header specifies a destination communication module coupled to the appropriate local communication link if the inbound communication cell specifies a local termination on the BCX 20.

The communication module 50 encapsulates the inbound communication cell into a cell frame having the selected cell frame header. The communication module 50 then generates a transmission request in response to a poll by the arbiter 41. The transmission request to the arbiter 41 specifies the communication module indicated by the cell frame header as the destination for the cell frame. The arbiter 41 then configures the switching circuit 42 to create a serial data transfer link in the switching circuit 42 according to the transmission request.

Thereafter, the communication module 50 transmits the cell frame containing the inbound communication cell over the configured serial data transfer link in the cell exchange lines 62 to the destination communication module.

The destination communication module receives the cell frame over the configured serial data transfer link, removes the encapsulated communication cell from the cell frame, and stores the communication cell in the queue channel specified by the cell frame header. The destination communication module then transmits the communication cell over a broadband communication link or a local communication link according to the cell service parameters for the queue channel.

The arbiter 41 polls the communication modules 50-53 according to a sequence determined by the control processor 40. The control processor 40 determines the poll sequence ordering and priority to ensure that each of the communication modules 50-53 has sufficient access to serial data transfer links through the switching circuit 42.

Figure 3:
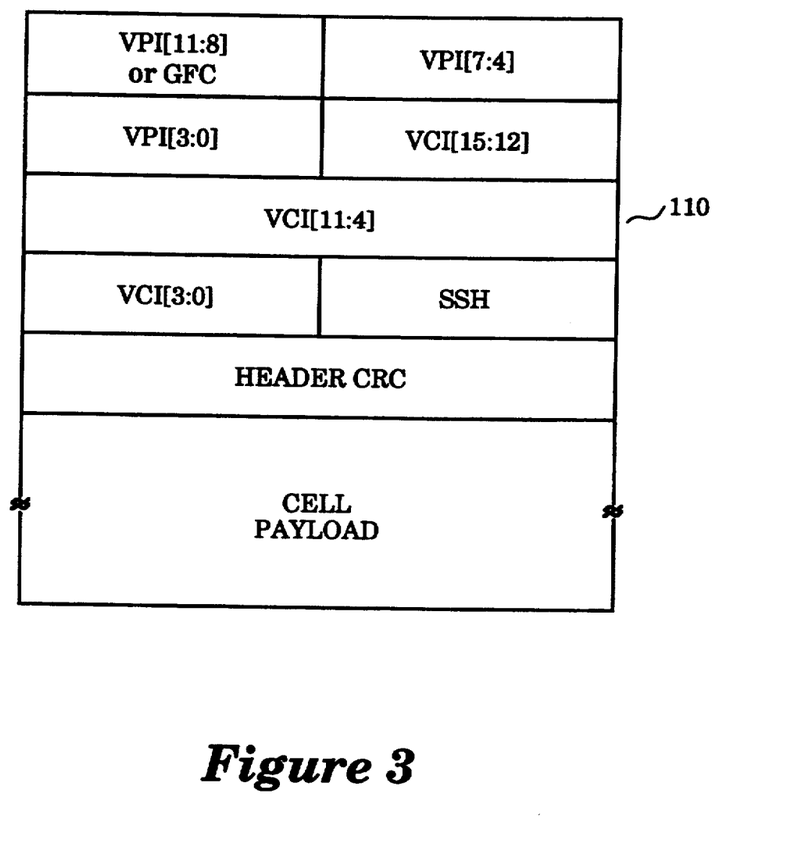
FIG. 3 illustrates the format of an inbound communication cell for one embodiment.

FIG. 3 illustrates the format of an inbound communication cell 110 for one embodiment. The inbound communication cell 110 comprises a 12 bit virtual path identifier (VPI[11:0]) and a 16 bit virtual circuit identifier (VCI[16:0]). The virtual path identifier may be used to specify a virtual path through the communication network 200 for the inbound communication cell 110. The virtual circuit identifier may be used to specify a local termination on the communication network 200 for the inbound communication cell 110.

The inbound communication cell 110 further comprises a standard specific header field (SSH), a header cyclic redundancy code (CRC), and a cell payload. The cell payload contains the payload data for the inbound communication cell 110.

The inbound communication cell 110 illustrates a communication cell for a network-network interface (NNI) standard. An alternative user network interface (UNI) standard provides of an 8 bit virtual path identifier for the inbound communication cell 110. The VPI [11:8] is replaced with a generic flow control (GFC)

field for the UNI version of the inbound communication cell 110.

Figure 4:
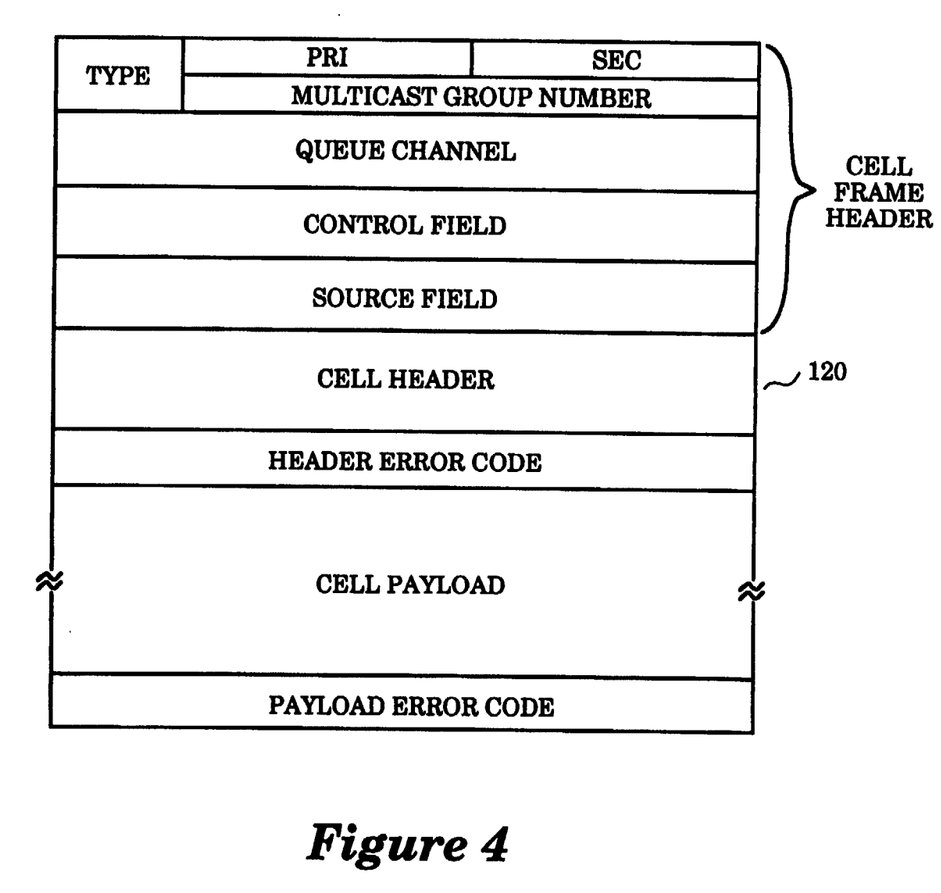
FIGS. 4 illustrates the format for a cell frame for one embodiment, wherein the cell frame comprises a cell frame header, a cell header from an encapsulated inbound communication cell, a header error code, a cell payload from an encapsulated inbound communication cell, and a payload error code.

FIG. 4 illustrates the format for a cell frame 120 for one embodiment. The cell frame 120 comprises a cell frame header, a cell header from an encapsulated inbound communication cell, a header error code, a cell payload from an encapsulated inbound communication cell, an a payload error code.

The cell frame header includes a destination field comprising a type field, and either a primary (PRI) and secondary (SEC) communication module identifier or a multicast group number. The type field specifies whether the cell frame 120 is a single destination cell frame or a multicast cell frame. If the type field specifies a single destination cell frame, the primary communication module identifier specifies the primary destination for the cell frame 120 and the secondary communication module identifier specifies a backup destination for the cell frame 120. If the type field specifies a multicast cell, the multicast group number specifies a group of destination communication modules.

The cell frame header further comprises a queue channel field and a control field. The queue channel field specifies one of the queue channels contained in the destination communication module. The specified queue channel buffers the encapsulated communication cell prior to outbound transmission. The control field contains parameters that are employed during queue channel servicing to control cell queue congestion in the communication network 200.

The cell frame header further comprises a source field that indicates the source communication module from among the communication modules 50-53 for the cell frame 120.

Figure 5:
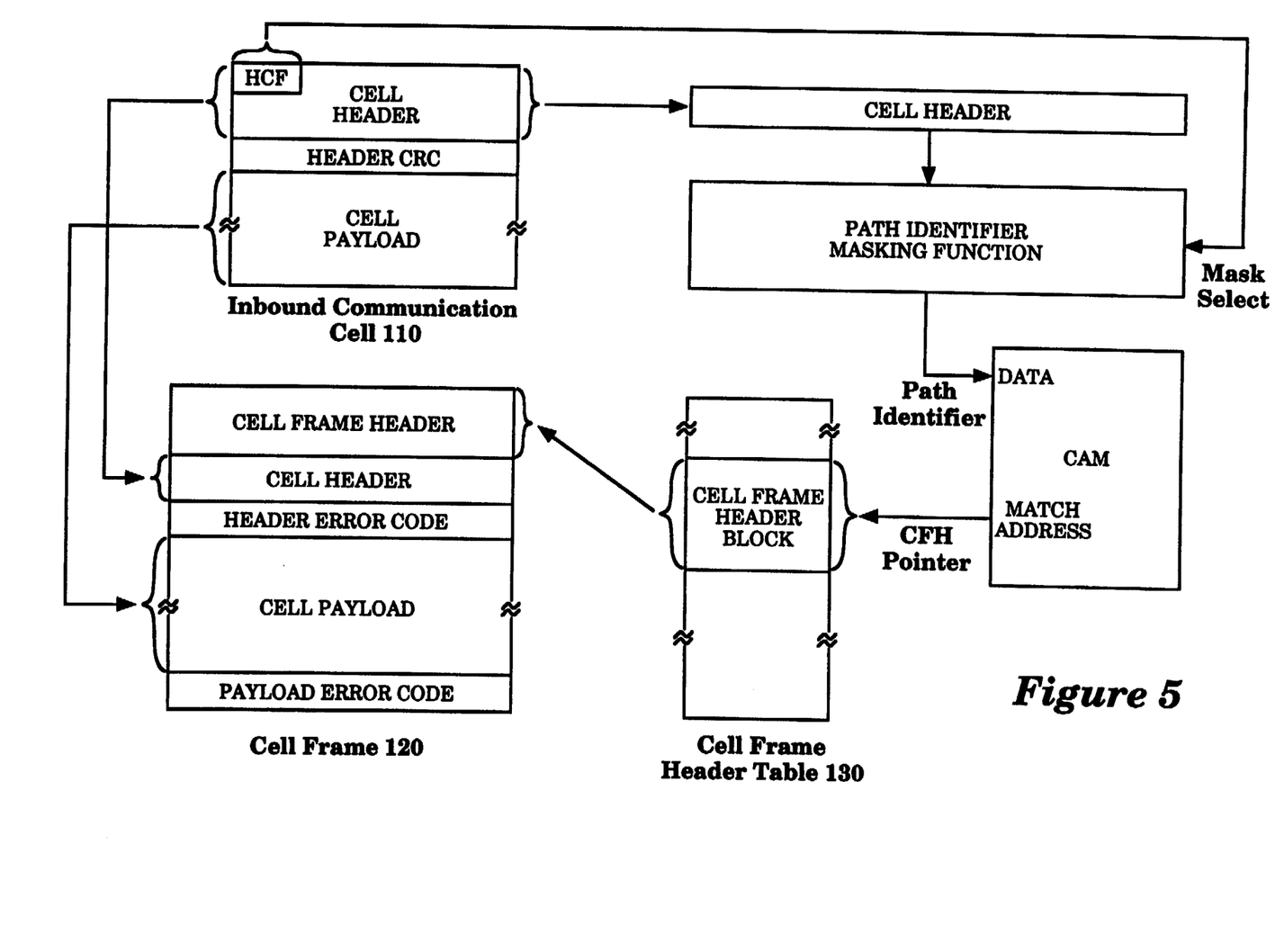
FIG. 5 illustrates the encapsulation of the inbound communication cell into the cell frame by the communication module.

FIG. 5 illustrates the encapsulation of the inbound communication cell 110 into the cell frame 120 by the communication module 50. The communication module 50 receives the inbound communication cell 110 over the broadband communication link 30. The communication module 50 assembles the cell frame 120 comprising a cell frame header, the cell header from the inbound communication cell 110, a header error code, the cell payload from the inbound communication cell 110, and a payload error code.

The communication module 50 decodes a portion of the cell header of the inbound communication cell 110 as a header control field (HCF). For one embodiment, the upper two bits of the cell header comprise the header control field HCF.

The header error code provides a bit by bit parity check of the cell frame header and the cell header portions of the cell frame 120. The header error code enables verification of the header information in the cell frame 120 by the destination communication module.

The payload error code provides a bit by bit parity check of the cell payload contained in the cell frame 120. The payload error code enables verification of the cell frame 120 payload data by the destination communication module.

The communication module 50 extracts a path identifier from the inbound communication cell 110 by performing a path identifier masking function on the cell header. For one embodiment, the HCF portion of the cell header selects the path identifier masking function from a set of preprogrammed path identifier masking functions implemented in the communication module 50. For another embodiment, a single preprogrammed masking function for a standard cell header format is implemented in the communication module 50.

The control processor 40 programs the path identifier masking functions into the communication module 50 over the control processor bus 61. The path identifier masking function extracts a local termination path identifier and a pass through path identifier for the inbound communication cell 110.

The local termination path identifier indicates a local termination for the communication cell 110 on the communication network 200. For example, the path identifier masking functions may be preprogrammed to extract the combined VPI and VCI bits of the inbound communication cell 110 as the local termination path identifier.

The pass through path identifier indicates a virtual path for the communication cell 110 through the communication network 200. For example, the path identifier masking functions may be preprogrammed to extract the VPI bits of the inbound communication cell 110 as the pass through path identifier.

The local termination path identifiers and the pass through path identifiers specify cell frame header blocks in a cell frame header table 130. The cell frame header table 130 contains a set of preprogrammed cell frame header blocks. The control processor 40 programs the cell frame header blocks into the cell frame header table 130 over the control processor bus 61.

The local termination path identifiers and the pass through path identifiers map to the cell frame header table 130 via a content addressable memory (CAM). The control processor 40 programs the local termination path identifiers and the pass through path identifiers into the CAM over the control processor bus 61.

The local termination path identifiers and the pass through path identifiers provide data inputs the CAM. The CAM generates match addresses corresponding to the local termination path identifiers and the pass through path identifiers. The match address indicates the CAM entry that stores the local termination path identifiers or the pass through path identifiers. The match address provides a pointer to a cell frame header block in the cell frame header table 130. The selected cell frame header block provides the cell frame header for the cell frame 120.

Figure 6:
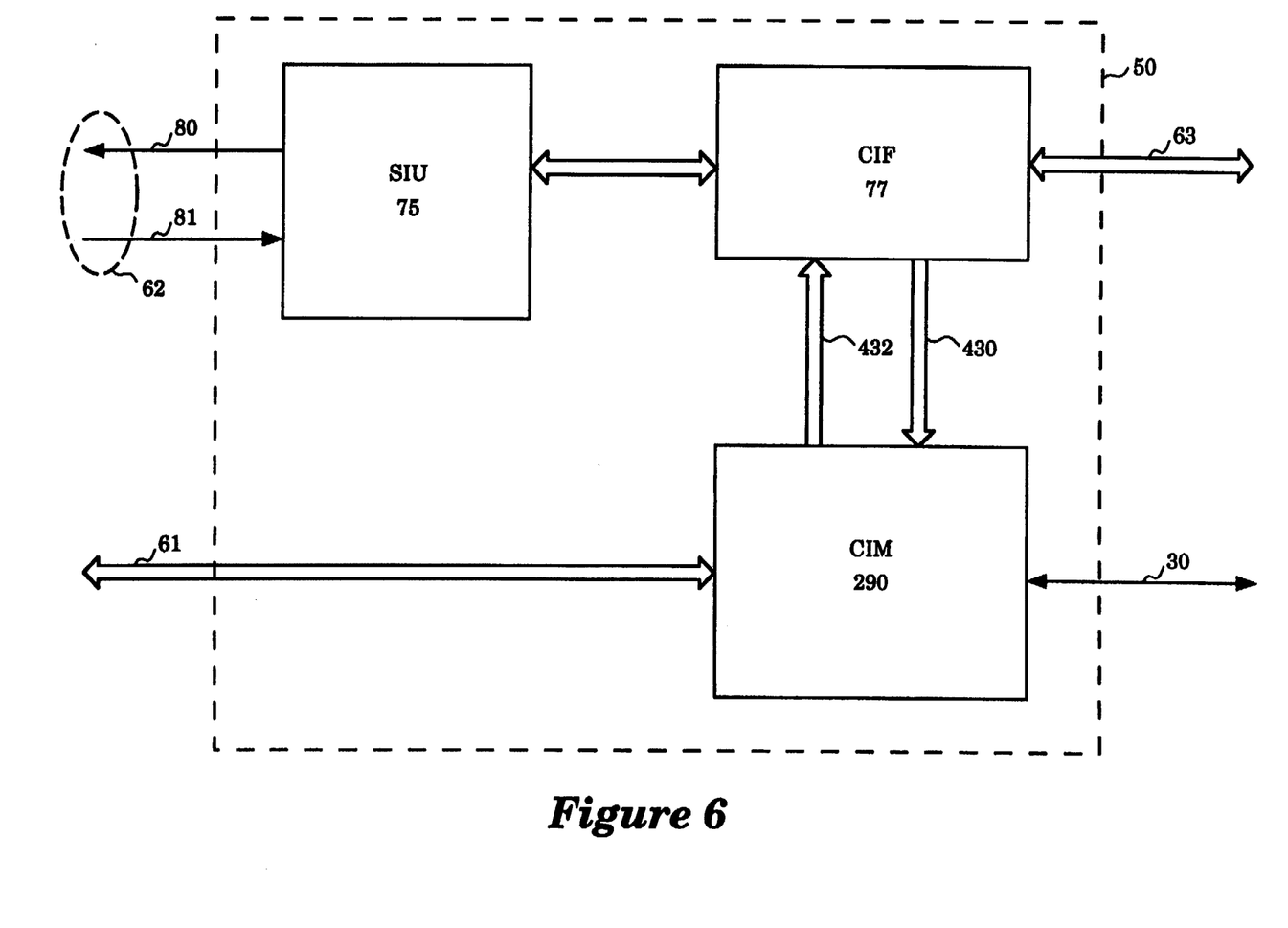
FIG. 6 illustrates a communication module comprising a serial interface unit (SIU), a communication interface formatter (CIF), and a communication interface module (CIM)

FIG. 6 illustrates the communication module 50. The communication module 50 comprises a serial interface unit (SIU) 75, a communication interface formatter (CIF) 77, and a communication interface module (CIM) 290.

The SIU 75 enables serial communication through configured serial data transfer links in the switching circuit 42 over the cell exchange lines 62. The cell exchange lines 62 comprise multiple pairs of transmit and receive data lines. The cell exchange lines 62 include a transmit data line 80 and a receive data line 81 coupled to the SIU 75.

The CIF 77 enables transfer of communication cells between the SIU 75 and the CIM 290. The CIF 77 also handles polls from the arbiter 41 over the arbitration/control bus 63.

The CIM 290 enables transfer of communication cells over the broadband communication link 30. The CIM 290 implements queue channels for buffering outbound communication cells prior to transfer over the communication network 200.

The CIM 290 receives inbound communication cells over the broadband communication link 30, encapsulates the inbound communication cells into cell frames, and transfers the cell frames to the CIF 77. The CIF 77 then generates an appropriate transmission request in response to a poll by the arbiter 41. The arbiter 41 configures the switching circuit 42 to create a serial data transfer link in the switching circuit 42 according to the transmission request. The CIF 77 then transfers the cell frame to the SIU 75, and the SIU 75 serially transmits the cell frame through the configured serial data transfer link on the cell exchange lines 62 to the destination communication module.

The SIU 75 receives the cell frames through the serial data transfer links in the cell exchange lines 62, performs clock and data recovery, and transfers the cell frames to the CIF 77. The CIF 77 disassembles the encapsulated communication cells from the cell frames, and transfers the communication cells to the CIM 290. The CIM 290 buffers the disassembled communication cells in the queue channels specified by the cell frame headers. The CIM 290 then transfers the communication cells over the broadband communication link 30 as outbound communication cells according to pre defined queue service parameters for the queue channels.

Figure 7:
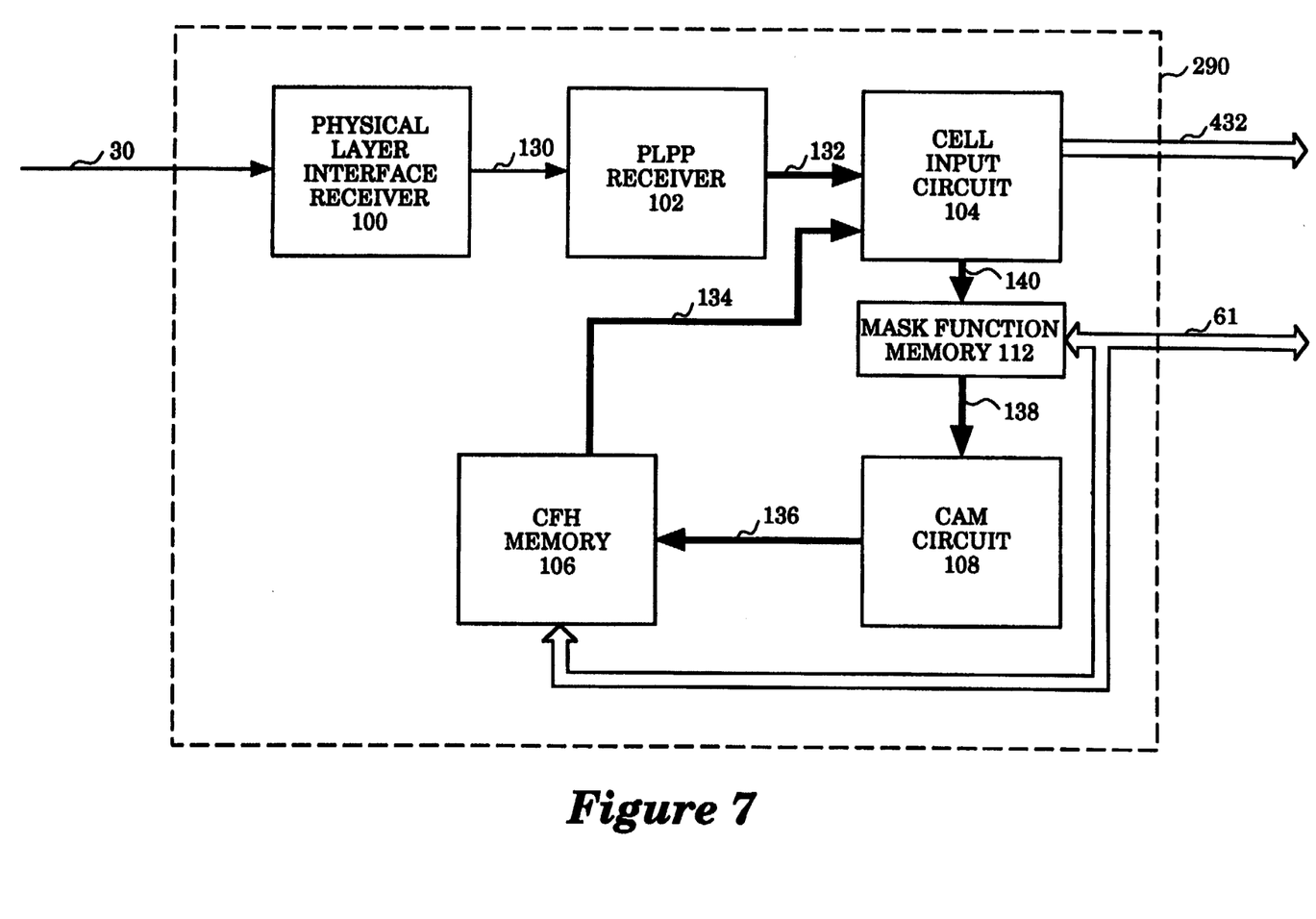
FIG. 7 illustrates an inbound cell circuit comprising a physical layer interface circuit, a physical layer protocol processor (PLPP) circuit, a cell input circuit, a cell frame header (CFH) memory, a content addressable memory (CAM), and a mask function memory.

FIG. 7 illustrates an inbound cell circuit in the CIM 290 for one embodiment. The inbound cell circuit comprises a physical layer interface receiver 100, a physical layer protocol processor (PLPP) receiver 102, a cell input circuit 104, a cell frame header (CFH) memory 106, a content addressable memory (CAM) circuit 108, and a mask function memory 112.

The physical layer interface receiver 100 receives inbound communication cells over the broadband communication link 30. The physical layer interface receiver 100 performs analog signal level to digital signal level conversion on the inbound communication cell signal. The physical layer interface receiver 100 transfers the serial bit stream over a signal line 130. For one embodiment, the broadband communication link 30 comprises a T3 communication line, and the physical layer interface receiver 100 is a T3 receiver.

The PLPP receiver 102 receives the serial bit stream from the physical layer interface receiver 100, and locates the cell boundaries of the inbound communication cells. The PLPP receiver 102 places a byte stream comprising the inbound communication cells in an internal first-in-first-out (FIFO) memory. The FIFO is read by the cell input circuit 104 over a cell bus 132. The PLPP receiver 102 also transfers sync signals over the cell bus 132 to notify the cell input circuit 104 that a complete cell is assembled in the internal FIFO.

The cell input circuit 104 fetches the inbound communication cell byte stream over the cell bus 132, and encapsulates the inbound communication cells into cell frames. The cell input circuit 104 receives cell frame headers for the cell frames from the CFH memory 106 over a CFH bus 134.

The CFH memory 106 is a random access memory that stores the cell frame header table 130. The cell frame header table 130 contains a set of preprogrammed cell frame header blocks. The control processor 40 programs the cell frame header blocks into the CFH memory 106 over the control processor bus 61.

The mask function memory 112 performs the path identifier masking functions to extract the local termination path identifier and the pass through path identifier for each inbound communication cell. The mask function memory 112 stores mask data values for each byte of the cell header. For one embodiment, each mask data value in the mask function memory 112 comprises 8 bits. The control processor 40 programs the mask data values into the mask function memory 112 over the control processor bus 61.

The cell input circuit 104 selects the mask data values from the mask function memory 112 through a mask function input bus 140. The mask function input bus 140 provides an address for the mask data values stored in the mask function memory 112. The mask function input bus 140 comprises a pass select signal, an HCF select signal, a header byte select signal, and a header byte data value.

The pass select signal selects either a set of pass through identifier masking functions or local termination identifier masking functions. The cell input circuit 104 sets the pass select signal=0 to perform the local termination masking functions, and sets the pass select signal=1 to perform the pass through identifier masking functions.

The HCF select signal reflects the HCF field of the inbound communication cells. For one embodiment, the 2 bit HCF field selects a set of masking functions from 4 available sets of masking functions.

The header byte select signal maps each byte of the cell header to the mask function memory 112. For one embodiment, the header byte select signal ranges between 0 and 3 because the cell header comprises 4 bytes and the mask data values are 8 bits wide.

The header byte data value successively carries each byte of the cell header. The cell input circuit 104 transfers each byte of the cell header sequentially over the mask function input bus 140 as the header byte data value to perform the selected path identifier masking function on the destination address.

The mask function memory 112 transfers the mask data values selected via the mask function input bus 140 to the CAM circuit 108 over a path identifier bus 138. The CAM circuit 108 assembles the mask data values into a 32 bit path identifier. The CAM circuit 108 then performs a CAM look-up for the path identifier. The CAM circuit 108 transfers a match address to the CFH memory 106 over a CFH pointer bus 136 if a CAM match for the path identifier occurs.

The match address on the CFH pointer bus 136 provides a pointer to a cell frame header block stored in the CFH memory 106. The cell input circuit 104 receives the selected cell frame header block over the CFH bus 134. The cell input circuit 104 then inserts the cell frame header into a cell frame as described above. The cell input circuit 104 transfers the cell frame to the CIF 77 over a bus 432.

Figure 8:
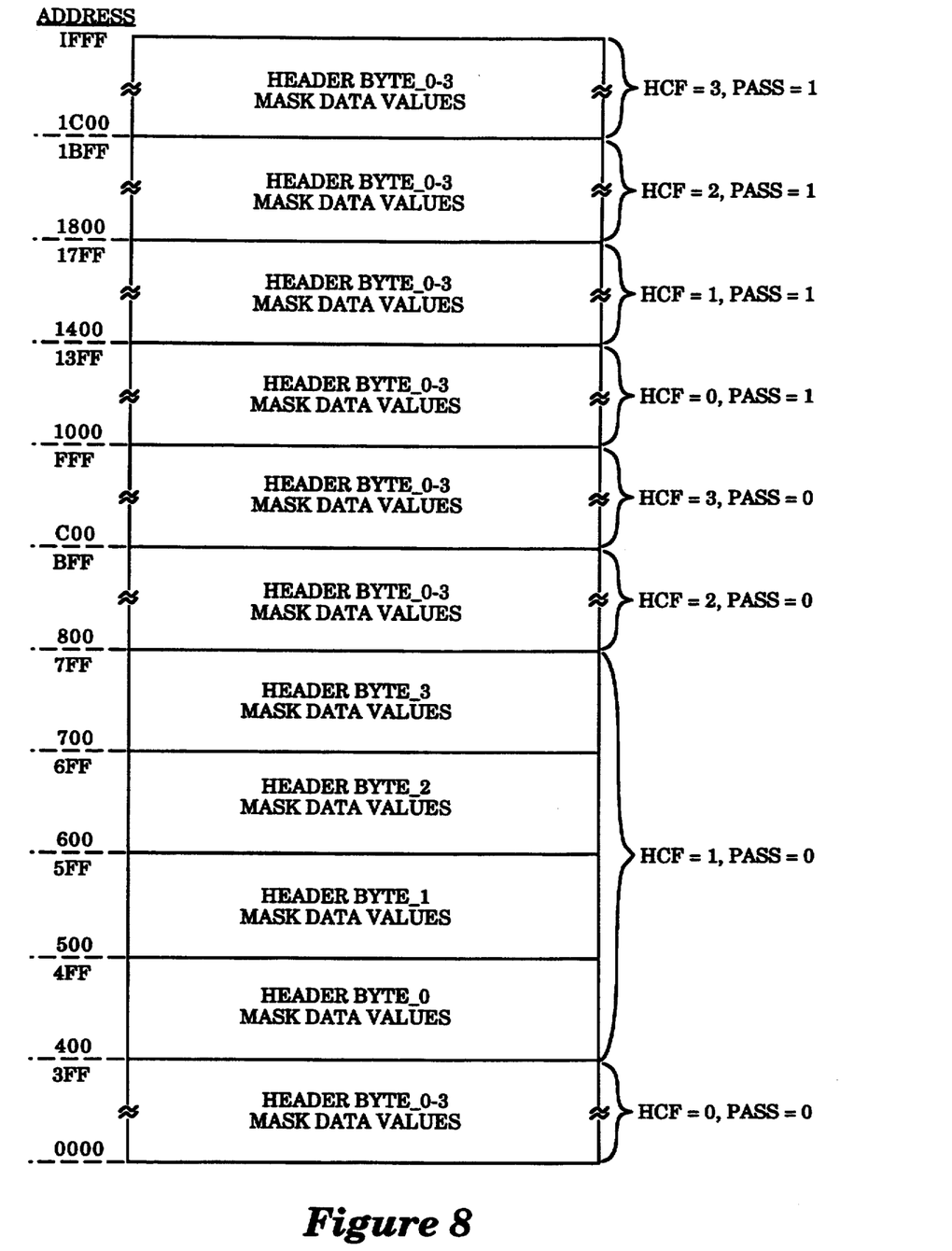
FIG. 8 illustrates an arrangement of masked data values in the mask function memory for one embodiment.

FIG. 8 illustrates an arrangement of masked data values in the mask function memory 112 for one embodiment. The mask function input bus 140 provides an 13 bit address for the mask data values. The pass select signal provides address bit 12 (the most significant bit), the HCF select signal provides address bits 11:10, the header byte select signal provides address bits 9:8, and the header byte data value provides address bits 7:0.

The mask function memory 112 contains mask data values for the local termination masking functions (PASS=0) and the pass through masking functions (PASS=1) for all possible HCF values and header byte values. For example, address 0 of the mask function memory 112 stores a mask data value for a header byte value=0, a header byte select=0, and an HCF=0, and a PASS=0. Likewise, address 1C40 hex of the mask function memory 112 stores a mask data value for a header byte value=40 hex, a header byte select=0, and an HCF=3, and a PASS=1.

Figure 9:
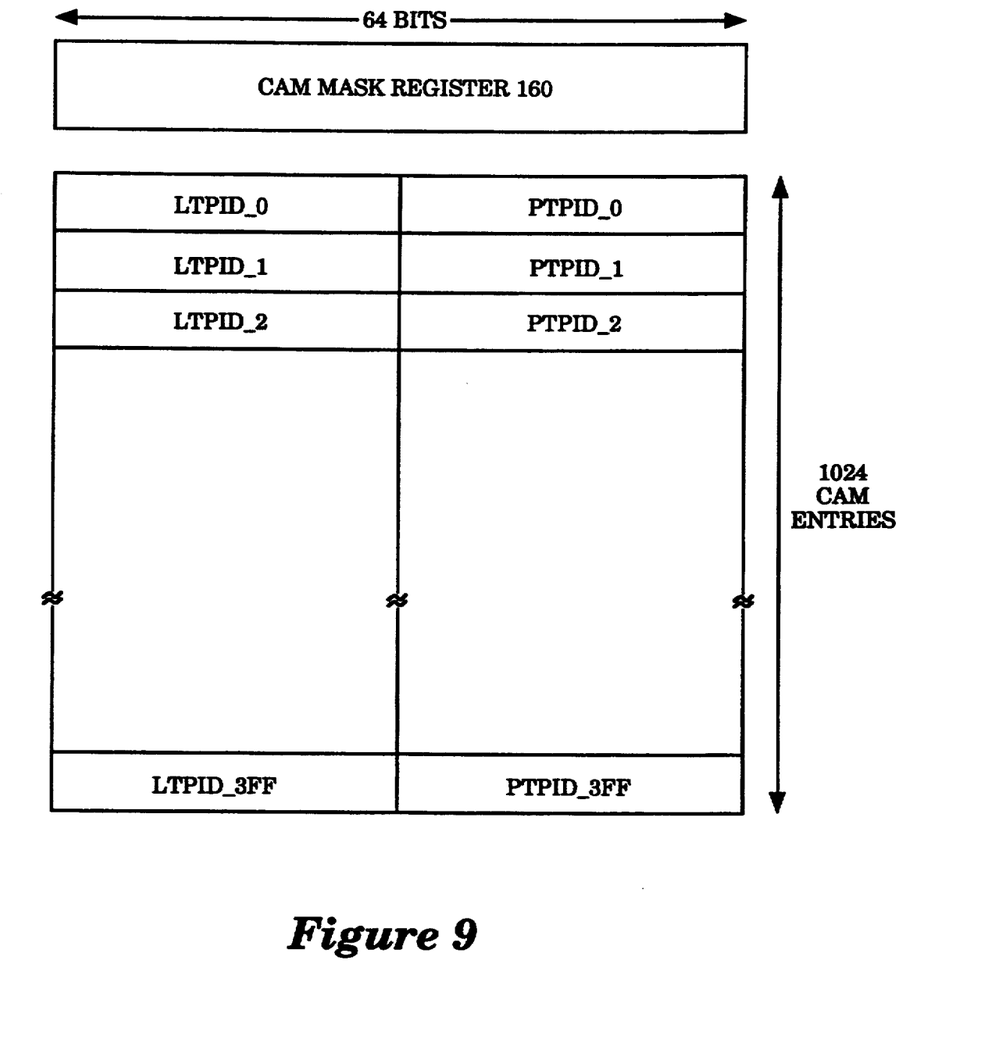
FIG. 9 illustrates a CAM circuit comprising a CAM mask register and a set of 1024 CAM entries.

FIG. 9 illustrates the CAM circuit 108. The CAM circuit 108 comprises a CAM mask register 160 and a set of 1024 CAM entries. The CAM mask register 160 comprises 64 bits, and each CAM entry comprises 64 bits.

For one embodiment, each CAM entry stores a pair of path identifiers; a local termination path identifier (LTPID) and a pass through path identifier (PTPID). For example, the CAM entry 0 stores a LTPID_0 and a PTPID_0. The path identifiers in the CAM circuit 108 are programmed by the control processor 40 over the control processor bus 41.

For a local termination identifier CAM look-up, the cell input circuit 104 sets the upper 32 bits of the CAM mask register 160 to all one's and sets the lower 32 bits of the CAM mask register 160 to all zeros. The local termination identifier CAM look-up matches to the path identifiers LTPID_0 through LTPID_3FF.

For a pass through identifier CAM look-up, the cell input circuit 104 sets the upper 32 bits of the CAM mask register 160 to all zeros and sets the lower 32 bits of the CAM mask register 160 to all one's. The pass through identifier CAM look-up matches to the path identifiers PTPID_0 through PTPID_3 FF.

For other embodiments, a variety of LTPID and PTPID arrangements in the CAM circuit 108 are possible. The CAM mask register 160 identifies the appropriate bits in each CAM entry for either a LTPID match or a PTPID match.

Figure 10:
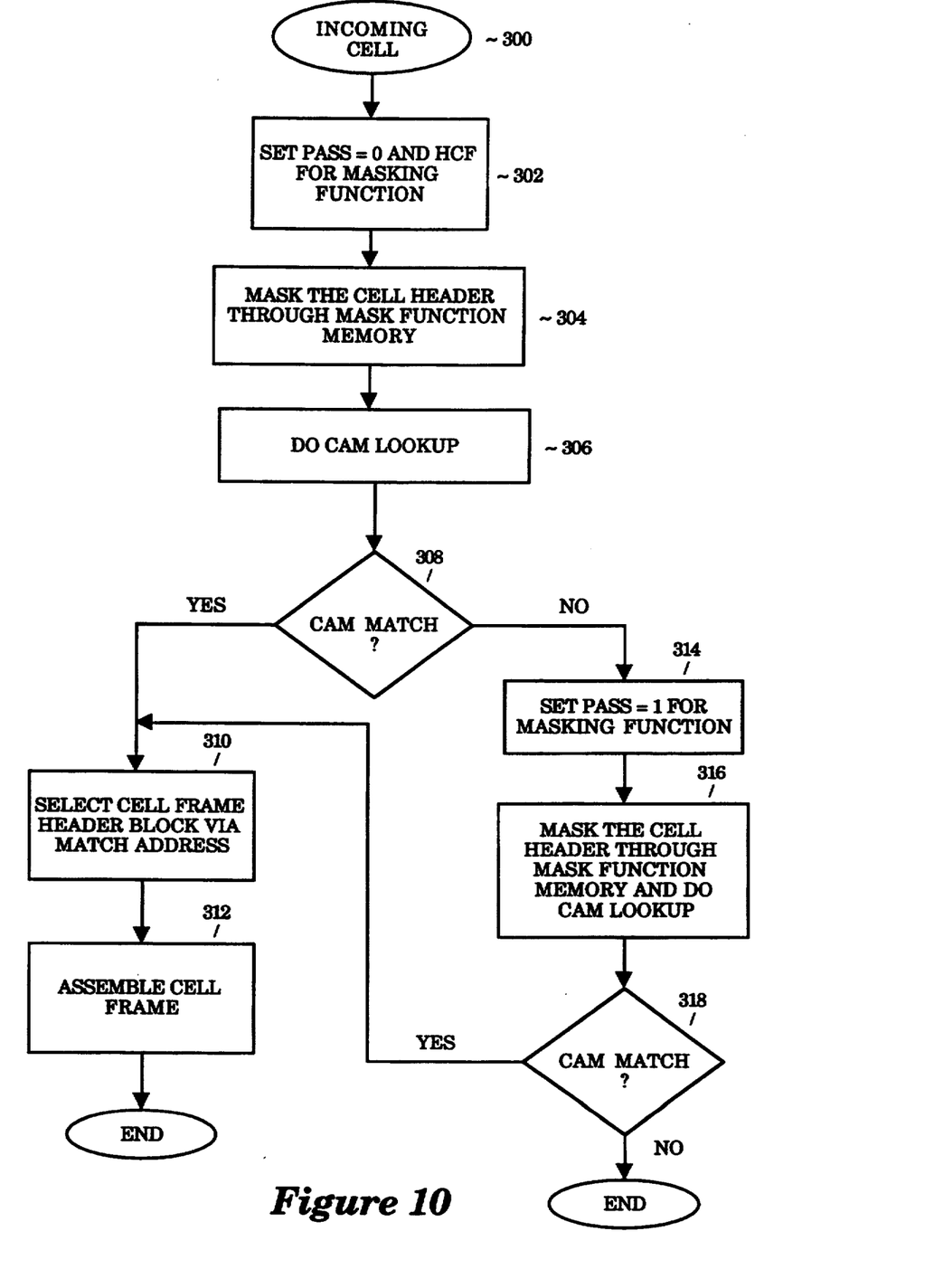
FIG. 10 is a flow diagram illustrating a method for selecting a cell frame header for an inbound communication cell.

FIG. 10 is a flow diagram illustrating a method for selecting a cell frame header for an inbound communication cell. At block 300, the cell input circuit 104 receives an inbound communication cell over the broadband communication link 30.

At block 302, the cell input circuit 104 selects the PASS=0 masking function by setting the pass select signal on the mask function input bus 140 to access the local termination mask data values in the mask function memory 112. The cell input circuit 104 also sets the HCF select signal on the mask function input bus 140 according to the HCF field of inbound communication cell.

At block 304, the cell input circuit 104 performs the selected path identifier masking function on the cell header by transferring the header bytes and corresponding header byte select signals to the mask function memory 112 via the mask function input bus 140. The mask function memory 112 transfers the selected mask data values to the CAM circuit 108 over path identifier bus 138.

At block 306, the cell input circuit 104 sets the upper 32 bits of the CAM mask register 160 to all one's and sets the lower 32 bits of the CAM mask register 160 to all zeros to match to the path identifiers LTPID_0 through LTPID_3FF. The CAM circuit 108 assembles the mask data values corresponding to the destination address of the cell header into a 32 bit path identifier and then performs a CAM look-up for the path identifier. If a CAM match is detected at decision block 308, then control proceeds to block 310.

At block 310, the CAM circuit 108 transfers the match address to the CFH memory 106 over the CFH pointer bus 136 to access a cell frame header block from the CFH memory 106. Thereafter at block 312, the cell input circuit 104 receives the selected cell frame header block over the CFH bus 134, and assembles the cell frame as previously described.

If a CAM match does not occur at decision block 308, then control proceeds to block 314. At block 314, the cell input circuit 104 selects the PASS=1 masking functions by setting the pass select signal on the mask function input bus 140 to access the pass through mask data values in the mask function memory 112.

At block 316, the cell input circuit 104 performs the selected path identifier masking function on the cell header by again transferring the header bytes and corresponding header byte select signals to the mask function memory 112 via the mask function input bus 140. The cell input circuit 104 sets the upper 32 bits of the CAM mask register 160 to all zeros and sets the lower 32 bits of the CAM mask register 160 to all one's to match to the path identifiers PTPID_0 through PTPID_3FF. The CAM circuit 108 assembles the mask data values corresponding to the destination address of the cell header into a 32 bit path identifier and then performs a CAM look-up for the new path identifier.

If a CAM match is detected at decision block 318, then control proceeds to block 310 to access a pass through cell header block from the CFH memory 106.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for routing a communication cell in a cell switching communication controller, comprising the steps of:

receiving the communication cell over a first communication link in a cell relay network, the communication cell having a cell having a cell header that specifies a destination address;

generating a path identifier by performing a path identifier masking function on the destination address, the path identifier masking function defined by a set of predetermined mask data values wherein the step of generating the path identifier comprises the step of masking the destination address according to a local termination masking function defined by the predetermined mask data values, the local termination masking function generating a local termination identifier wherein the local termination masking function is specified from a plurality of predetermined local termination masking functions by a header control field of the cell header;

matching the path identifier to a content addressable memory such that a match address in the content addressable memory specifies a virtual circuit destination in a communication network for the communication cell, the content addressable memory comprising a plurality of entries, wherein each entry stores a preconfigured local termination identifier and a preconfigured pass through identifier and wherein the match address specifies a preconfigured cell frame header block stored in a cell frame header table;

transferring the communication cell to the virtual circuit destination over the communication network by reading the cell frame header block from the cell frame header table according to the match address, and generating a cell frame comprising the cell frame header block, the cell header, and a cell payload from the communication cell and by transferring the cell frame to a destination communication module specified by the cell frame header block, such that the destination communication module transfers the communication cell over a second communication link.

2. The method of claim 1, wherein the step of matching the path identifier to a content addressable memory comprises the steps of:

setting a CAM mask register in the content addressable memory to mask off the preconfigured pass through identifier of each entry;

matching the local termination identifier to the content addressable memory such that the match address specifies the cell frame header block.

if the local termination identifier is stored in the content addressable memory, then selecting the cell frame header block from a cell frame header table, such that the cell frame header block is specified by a content addressable memory address corresponding to the local termination identifier.

3. A method for routing a communication cell in a cell switching communication controller, comprising the steps of:

receiving the communication cell over a first communication link in a cell relay network, the communication cell having a cell header that specifies a destination address;

generating a path identifier by performing a path identifier masking function on the destination address, the path identifier masking function defined by a set of predetermined mask data values wherein the step of generating the path identifier comprises the step of masking the destination address according to a pass through masking function defined by the predetermined mask data values, the pass through masking function generating a pass through identifier wherein the pass through masking function is specified from a plurality of predetermined pass through masking functions by a header control field of the cell header;

matching the path identifier to a content addressable memory such that a match address in the content addressable memory specifies a virtual circuit destination in a communication network for the communication cell, the content addressable memory comprising a plurality of entries, wherein each entry, stores a preconfigured local termination identifier and a preconfigured pass through identifier and wherein the match address specifies a preconfigured cell frame header block stored in a cell frame header table;

transferring the communication cell to the virtual circuit destination over the communication network by reading the cell frame header block from the cell frame header table according to the match address, and generating a cell frame comprising the cell frame header block, the cell header, and a cell payload from the communication cell and by transferring the cell frame to a destination communication module specified by the cell frame header block, such that the destination communication module transfers the communication cell over a second communication link.

4. The method of claim 3 wherein the step of matching the path identifier to a content addressable memory comprises the steps of:

setting a CAM mask register in the content addressable memory to mask off the preconfigured local termination identifier of each entry;

matching the pass through identifier to the content addressable memory such that the match address specifies the cell frame header block.

if the pass through identifier is stored in the content addressable memory, then selecting the cell frame header block from a cell frame header table, such that the cell frame header block is specified by a content addressable memory address corresponding to the pass through identifier.

5. A circuit for routing a communication cell in a cell switching communication controller, comprising:

circuit for receiving the communication cell over a first communication link in a cell relay network, the communication cell having a cell header that specifies a destination address;

circuit for generating a path identifier by performing a path identifier masking function on the destination address, the path identifier masking function defined by a set of predetermined mask data values wherein the circuit for generating a path identifier by performing a path identifier masking function on the destination address comprises circuit for masking the destination address according to a local termination masking function defined by the predetermined mask data values, the local termination masking function generating a local termination identifier wherein the local termination masking function is specified from a plurality of predetermined local termination masking functions by a header control field of the cell header;

circuit for matching the path identifier to a content addressable memory such that a match address in the content addressable memory specifies a virtual circuit destination in a communication network for the communication cell, the content addressable memory comprising a plurality of entries, wherein each entry stores a preconfigured local termination identifier and a preconfigured pass through identifier wherein the match address specifies a preconfigured cell frame header block stored in a cell frame header table;

circuit for transferring the communication cell to the virtual circuit destination over the communication network comprising a circuit for reading the cell frame header block from the cell frame header table according to the match address, and a for generating a cell comprising the cell frame header block, the cell header, and a cell payload from the communication cell and a circuit for transferring the cell frame to a destination communication module specified by the cell frame header block, such that the destination communication module transfers the communication cell over a second communication link.

6. The circuit of claim 5, wherein the circuit for matching the path identifier to a content addressable memory comprises:

circuit for setting a CAM mask register in the content addressable memory to mask off the preconfigured pass through identifier of each entry;

circuit for matching the local termination identifier to the content addressable memory such that the match address specifies the cell frame header block.

circuit for selecting the cell frame header block from a cell frame header table if the local termination identifier is stored in the content addressable memory, such that the cell frame header block is specified by a content addressable memory address corresponding to the local termination identifier.

7. A circuit for routing a communication cell in a cell switching communication controller, comprising:

circuit for receiving the communication cell over a first communication link in a cell relay network, the communication cell having a cell header that specifies a destination address;

circuit for generating a path identifier by performing a path identifier masking function on the destination address, the path identifier masking function defined by a set of predetermined mask data values wherein the circuit for generating a path identifier by performing a path identifier masking function on the destination address comprises circuit for masking the destination address according to a pass through masking function defined by a predetermined mask data values, the pass through masking function generating a pass through identifier wherein the pass through masking function is specified from a plurality of predetermined pass through masking functions by a header control field of the cell header;

circuit for matching the path identifier to a content addressable memory such that a match address in the content addressable memory, specifies a virtual circuit destination in a communication network for the communication cell, the content addressable memory comprising a plurality of entries, wherein each entry stores a preconfigured local termination identifier and a preconfigured pass through identifier wherein the match address specifies a preconfigured cell frame header block stored in a cell frame header table;

circuit transferring the communication cell to the virtual circuit destination over the communication network comprising a circuit for reading the cell frame header block from the cell frame header table according to the match address, and a for generating a cell frame comprising the cell frame header block, the cell header, and a cell payload from the communication cell and a circuit for transferring the cell frame to a destination communication module specified by the cell frame header block, such that the destination communication module transfers the communication cell over a second communication link.

8. The circuit of claim 7, wherein the circuit for matching the path identifier to a content addressable memory comprises:

circuit for setting a CAM mask register in the content addressable memory to mask off the preconfigured local termination identifier of each entry;

circuit for matching the pass through identifier to the content addressable memory such that the match address specifies the cell frame header block;

circuit for selecting the cell frame header block from a cell frame header table if the pass through identifier is stored in the content addressable memory, such that the cell frame header block is specified by a content addressable memory address corresponding to the pass through identifier.

9. A communication controller, comprising:

memory that stores a set of predetermined mask data values for each of a set of path identifier masking functions that map a destination address of a communication cell received over a first communication link to a path identifier wherein a header control field in the communication cell selects one of the path identifier masking functions;

content addressable memory that maps the path identifier to a cell frame header block in a cell frame header table such that the cell frame header block specifies a destination module in the communication controller that transfers the communication cell to the destination address over a second communication link.

10. The communication controller of claim 9, wherein the destination address and the header control field are contained in a cell header of the communication cell.

11. The communication controller of claim 9, wherein the path identifier masking functions include a set of local termination masking functions that map the destination address to a local destination module that transfers the communication cell to the destination address over the second communication link.

12. The communication controller of claim 9, wherein the path identifier masking functions include a set of pass through masking functions that map the destination address to a destination module that transfers the communication cell to a virtual address in a communication network over the second communication link.

13. The communication controller of claim 9, wherein content addressable memory comprises a plurality of entries each storing a preconfigured local termination identifier for matching to the path identifier.

14. The communication controller of claim 9, wherein content addressable memory comprises a plurality of entries each storing a preconfigured pass through identifier for matching to the path identifier.

15. The communication controller of claim 9, further comprising circuitry that reads the cell frame header block from the cell frame header table and that generates a cell frame comprising the cell frame header block, the cell header, and a cell payload from the communication cell and that transfers the cell frame to a destination communication module specified by the cell frame header block, such that the destination communication module transfers the communication cell over the second communication link.

* * * * *